E(12) United States Patent
Szilagyi et al.

(10) Patent No.: US 11,082,891 B2
(45) Date of Patent: Aug. 3, 2021

(54) CONTEXT AWARE QOS/QOE POLICY PROVISIONING AND ADAPTATION IN 5G SYSTEMS

(71) Applicant: Nokia Technologies Oy, Espoo (FI)

(72) Inventors: Peter Szilagyi, Budapest (HU); Csaba Vulkan, Budapest (HU); Kaisu Iisakkila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/091,502

(22) PCT Filed: Apr. 4, 2016

(86) PCT No.: PCT/US2016/025922
§ 371 (c)(1),
(2) Date: Oct. 4, 2018

(87) PCT Pub. No.: WO2017/176248
PCT Pub. Date: Oct. 12, 2017

(65) Prior Publication Data
US 2019/0124555 A1    Apr. 25, 2019

(51) Int. Cl.
*H04W 28/24*    (2009.01)
*H04W 28/12*    (2009.01)
(Continued)

(52) U.S. Cl.
CPC .............. *H04W 28/24* (2013.01); *H04L 47/20* (2013.01); *H04L 47/2425* (2013.01);
(Continued)

(58) Field of Classification Search
CPC . H04W 28/12; H04W 28/24; H04W 28/0236; H04W 28/0268; H04L 47/20; H04L 47/2425; H04L 47/2475
See application file for complete search history.

(56) References Cited

U.S. PATENT DOCUMENTS 6,463,470 B1 * 10/2002 Mohaban ............ H04L 41/0893
709/223
8,108,520 B2    1/2012 Ruutu et al.
(Continued)

FOREIGN PATENT DOCUMENTS

WO    WO 2009051531    4/2009

OTHER PUBLICATIONS

Gómez, Gerardo, et al., "Towards a QoE-driven resource control in LTE and LTE-A networks." Journal of Computer Networks and Communications, vol. 2013, Dec. 2012, (16 pages).
(Continued)

*Primary Examiner* — Rina C Pancholi
(74) *Attorney, Agent, or Firm* — Mintz Levin Cohn Ferris Glovsky and Popeo, P.C.

(57) ABSTRACT

Methods and apparatus, including computer program products, are provided for QoE/QoS management. In some example embodiments, there is provided a method. The method may include detecting, by an enforcement point, an initiation of a session for an application; requesting, by the enforcement point, a first level quality of experience policy for the detected session; receiving, from a policy server, the first level quality of experience policy for the detected session; deriving, based on the first level quality of experience policy, a second level quality of experience target and/or a quality of service target for the detected session; enforcing, by the enforcement point, the second level quality of experience target and/or the quality of service target on the detected session. Related apparatus, systems, methods, and articles are also described.

18 Claims, 9 Drawing Sheets

(51) Int. Cl.
*H04L 12/851* (2013.01)
*H04L 12/859* (2013.01)
*H04L 12/813* (2013.01)
*H04W 28/02* (2009.01)

(52) U.S. Cl.
CPC ..... *H04L 47/2475* (2013.01); *H04W 28/0236* (2013.01); *H04W 28/0268* (2013.01); *H04W 28/12* (2013.01)

(56) References Cited

U.S. PATENT DOCUMENTS

| | | | |
|---|---|---|---|
| 8,948,007 B2 | 2/2015 | Tan et al. | |
| 9,271,184 B2 | 2/2016 | Raleigh et al. | |
| 9,491,045 B2 | 11/2016 | Kvernvik et al. | |
| 9,788,211 B2 | 10/2017 | Zhang | |
| 9,794,266 B2 | 10/2017 | Faccin et al. | |
| 2006/0002377 A1* | 1/2006 | Skog | G06F 3/1454 |
| 2007/0124433 A1* | 5/2007 | Frost | H04L 47/10 709/220 |
| 2010/0211666 A1* | 8/2010 | Kvernvik | H04L 41/0681 709/223 |
| 2012/0195196 A1 | 8/2012 | Ghai et al. | |
| 2012/0314632 A1 | 12/2012 | Martinez De La Cruz et al. | |
| 2013/0279521 A1 | 10/2013 | Perez Martinez et al. | |
| 2014/0016464 A1* | 1/2014 | Shirazipour | H04L 47/11 370/235 |
| 2014/0022904 A1* | 1/2014 | Ahmad | H04W 28/0289 370/235 |
| 2014/0064210 A1* | 3/2014 | Anchan | H04W 72/08 370/329 |
| 2015/0043336 A1 | 2/2015 | Zhu | |
| 2015/0215832 A1 | 7/2015 | Fitzpatrick | |
| 2017/0325120 A1* | 11/2017 | Szilagyi | H04W 28/24 |
| 2019/0364457 A1* | 11/2019 | Szilagyi | H04L 47/2475 |

OTHER PUBLICATIONS

Sandvine, "Network Policy Control and the Migration to LTE," Sandvine Intelligent Broadband Networks, Nov. 11, 2013, (23 pages).

* cited by examiner

CONTEXT AWARE QOS/QOE POLICY PROVISIONING AND ADAPTATION IN 5G SYSTEMS

CROSS REFERENCE TO RELATED APPLICATIONS

This application is a national-phase entry of Patent Cooperation Treaty Application No. PCT/US2016/025922 filed Apr. 4, 2016, entitled "CONTEXT AWARE QOS/QOE POLICY PROVISIONING AND ADAPTATION IN 5G SYSTEMS," the contents of which are hereby incorporated by reference in their entirety.

FIELD

The subject matter disclosed herein relates to wireless communications.

BACKGROUND

Networks use quality of service (QoS) parameters to ensure that certain traffic types are handled in a certain way to provide a certain, threshold amount of QoS. For example, a given traffic flow may be classified by certain, generally static QoS parameters, such as guaranteed bit rate (GBR), non-guaranteed bit rate (non-GBR), priority handling, packet delay budget, packet error loss rate, and/or the other parameters. When a traffic flow has a certain QoS parameter, it may for example be forwarded via a radio bearer that can carry traffic according to the QoS parameter. Quality of Experience (QoE) represents a measure or indication of quality from the perspective of a user. As such, QoE may take into account the overall application or service layer performance of traffic between the application or service at a user equipment to a remote, network server, for example.

SUMMARY

Methods and apparatus, including computer program products, are provided for QoE/QoS management.

In some example embodiments, there is provided a method. The method may include detecting, by an enforcement point, an initiation of a session for an application; requesting, by the enforcement point, a first level quality of experience policy for the detected session; receiving, from a policy server, the first level quality of experience policy for the detected session; deriving, based on the first level quality of experience policy, a second level quality of experience target and/or a quality of service target for the detected session; enforcing, by the enforcement point, the second level quality of experience target and/or the quality of service target on the detected session.

In some variations, one or more of the features disclosed herein including the following features can optionally be included in any feasible combination. The first level quality of experience policy comprises a parent policy. The parent policy may include a trigger condition and a policy target representative of an intent policy type. The second level quality of experience target may comprise a second level child policy. The second level child policy may comprise a quality of experience target. The quality of experience target may comprise at least one of a target download time and/or a target bandwidth. The quality of service target may comprise a third level child policy. The enforcement point may request policy from the policy server as part of a service flow establishment for the session. The enforcement point may request policy from an intermediate node as part of a service flow establishment for the session. The enforcement point may forward received policy to another enforcement point. The enforcement point may be located at a core network node and/or a radio access network node. The deriving may be further based on context information associated with the application and/or network demand for resources.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
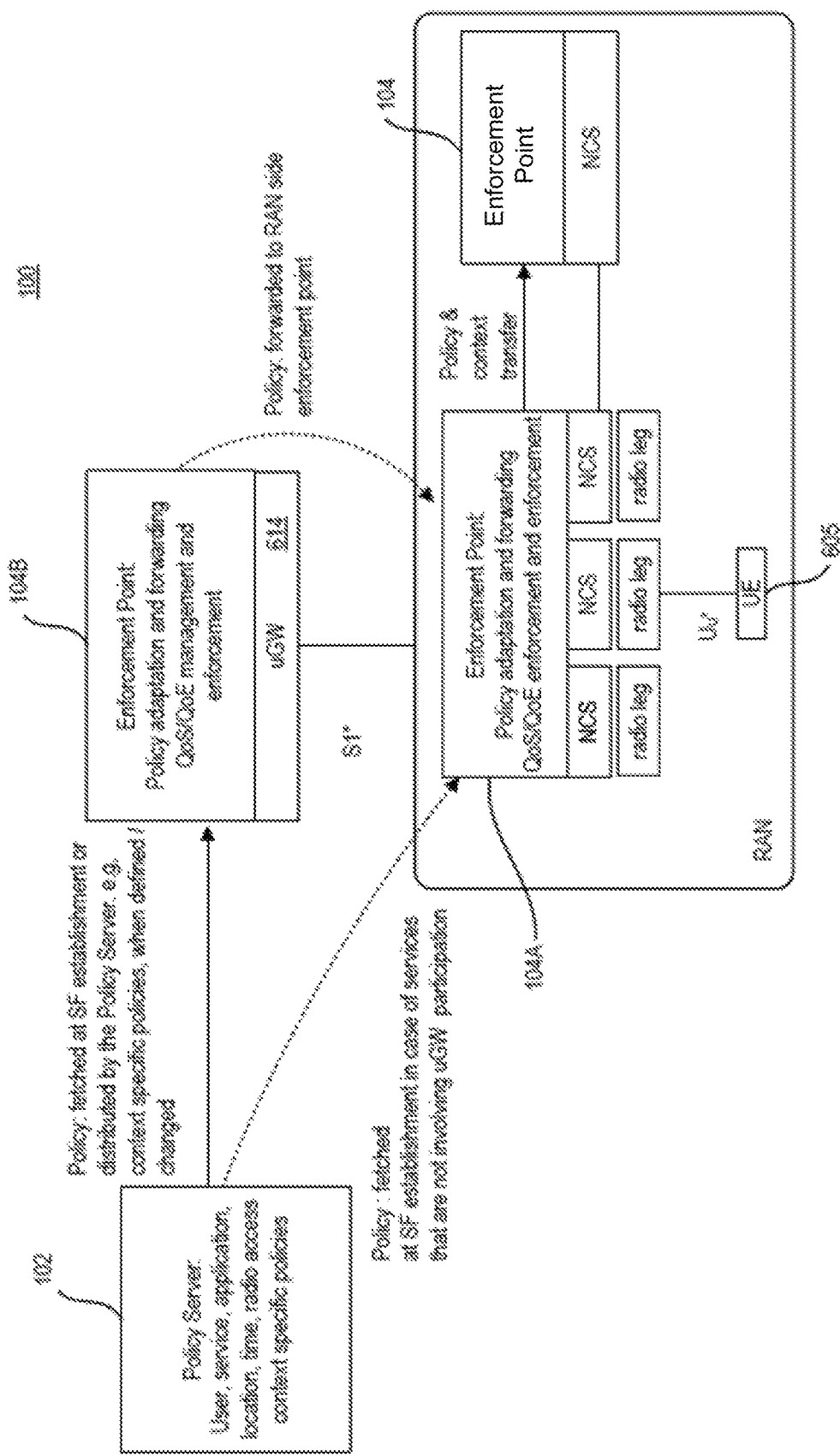
FIG. 1 depicts an example of a QoE architecture, in accordance with some example embodiments.

Like labels are used to refer to same or similar items in the drawings.

DETAILED DESCRIPTION

Traffic in wireless networks has become more diverse including a broad array of traffic including traffic from applications or services such as vehicle-to-everything (V2E), internet of things (IoT), video streaming, web page downloads, and the like. Moreover, each of these applications or services may have very different demands from the network at any given instant in time. However, simple static QoS-based approaches may not adequately address the dynamic nature of these applications or services.

In some example embodiments, there may be provided a policy server, such as a central policy server. The policy server may receive, determine, and/or store specific policies, network operator preferences, and/or context information (e.g., location, time, radio access, application identity, application type, demand for network resources, and/or the like)

for one or more applications, such as an end-user application, over-the-top (OTT) application, service, and/or the like.

In some example embodiments, there may be provided one or more enforcement points that perform QoS/QoE management by dynamically applying and enforcing policies in the context of the actual user plane traffic, services, applications, and network/resource status. In some example embodiments, the enforcement point may access user plane traffic to collect user, service, application, network specific insight, and/or the like. In some example embodiments, the enforcement point may execute actions on the traffic itself. In some example embodiments, enforcement points may control critical user plane system resources (such as radio and core network elements, transport infrastructure, and services that can be either be physical or virtual ones).

In some example embodiments, the policy server may manage QoS/QoE for networks, such as the 5G system as well as other types of networks. Moreover, the policy server may include a hierarchical policy framework in which high-level policies are made available to the enforcement points (which may be located at the RAN, at the core, and/or at other locations). For example, the policy server may include policy definitions, and the policy definitions may be organized into multiple abstraction levels. The enforcement point may make autonomous and dynamic decisions to determine or derive, from the high-level policy and/or context information, lower level QoE targets and/or QoS targets. To that end, the policy server may provide so-called "policy specialization" that programmatically uses highly abstract policies to generate more specific, lower level policies. For example, the policy server may be coupled to one or more enforcement points, and the enforcement points may be intelligent and/or autonomous in the sense that the enforcement points may (based on their access to the user-plane and based on context information regarding the network, user, resource availability, the application and/or the like) interpret high-level policies and perform policy specialization to generate more specific policies.

In some example embodiments, the policy server may also include policy signaling that provisions the policies in the one or more enforcement points. For example, policy charges and control (PCC) signaling may be extended or configured to allow the policy server to configure, via the Gx interface, polices in the enforcement point.

FIG. 1 depicts a block diagram of portions of a QoS/QoE framework 100, in accordance with some example embodiments.

The system 100 may include a central policy server 102 and at least one enforcement point 104, 104A, 104B. The central policy server 102 may store policies associated with applications, services, and/or the like which may be implemented at a user equipment and/or at other network nodes. Specifically, the central policy server 102 may store, for a given application or service, context information (for example, a location of the user equipment, a time, type of radio access, current demand for network resources, current QoS or QoE state of the application or service, and/or the like), specific policies, and/or network operator preferences.

In some example embodiments, the enforcement point 104, 104A, 104B may manage QoS/QoE by at least adaptively and/or dynamically applying and enforcing policies in the context of actual user plane traffic, services, applications, network status, and/or network resource status. In some example embodiments, the enforcement point may be implemented by the application convergence sub-layer, ACS. The enforcement point may access user plane traffic to collect user, service, application, network-specific context information, execute actions on the traffic itself, and/or control user plane system resources including so-called critical user plane system resources, such as radio bearers, core network resources, transport infrastructure, and/or services.

In some example embodiments, the enforcement point 104, 104A, 104B may determine (for example, derive) its actions from policies received (or retrieved) from the policy server 102, when a service flow for a given application or service is established. On the user-plane, the enforcement point may handle the traffic of one or more service flows, and the enforcement point may manage the QoE for each service flow. For efficient QoS/QoE management, the enforcement point may partition the user-plane flows within a service flow into sub-service flow. A sub-service flow may correspond to one service flow, and the sub-service flow may represent a logical separation carrying a subset of the service flow's traffic requiring a certain, dedicated QoS/QoE treatment.

In some example embodiments, the enforcement point 104, 104A, 104B may, for each service or subservice flow, autonomously (based on traffic and network context monitoring) define the QoS and/or QoE parameters and values for the customer experience level and network level policies. The autonomous and adaptive parameter definition may be required, when the network operator has not supplied an explicit policy defining the parameters.

The policy server 102 may include policy to enable QoS/QoE management, and certain functions, such as a home subscriber server (HSS), subscription profile repository (SPR), and/or policy and charging rules function (PCRF). For example, the policy server may include subscriber information (e.g., the type of user, list of subscribed services, and/or the like) and/or subscription information (e.g., details of the data plan). Alternatively or additionally, the policy server may aggregate policies such as maximum aggregated bitrate the user may use, or when the user traffic is going to be throttled if a certain amount (e.g., 5 GB) or monthly data is used. Moreover, the policy server may have this information on a per subscriber basis. The policies may provide the high-level QoE and/or QoE targets, service boundaries, preferences, and priorities for the QoS/QoE management framework. The dynamic and context based enforcement responsibility may be delegated to the QoS/QoE enforcement points.

Figure 2:
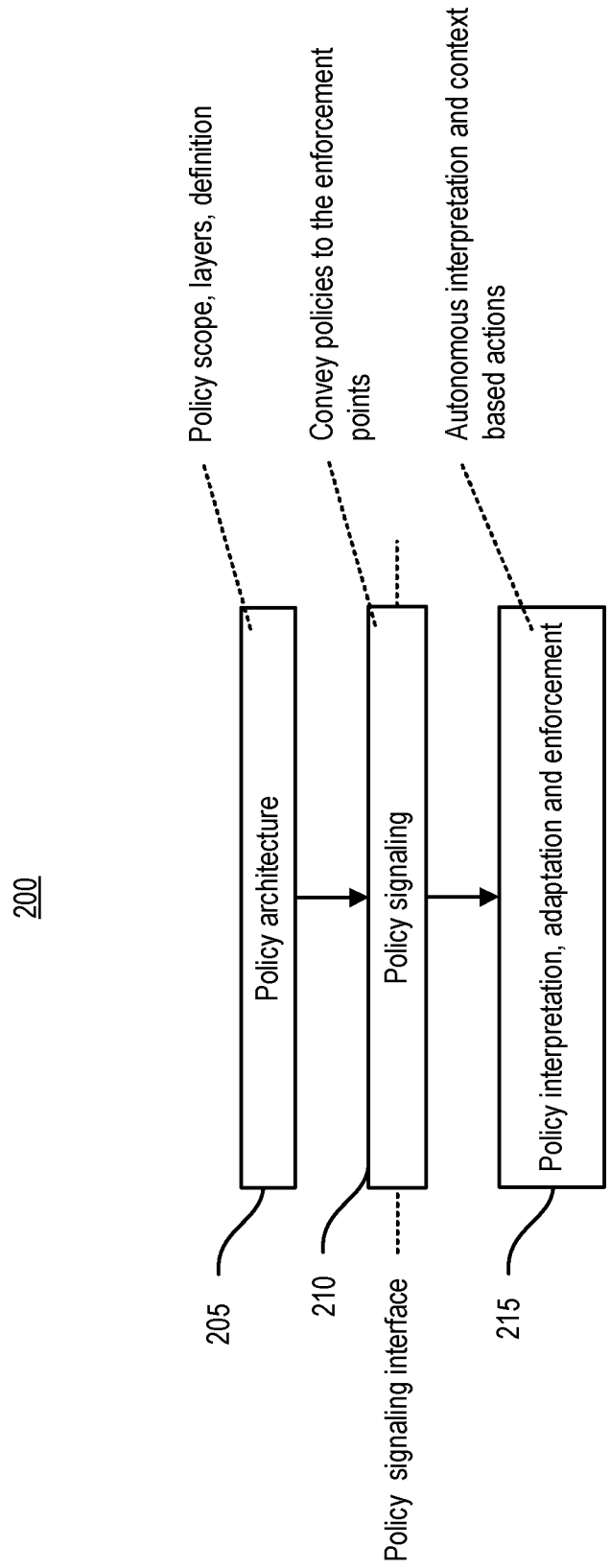
FIG. 2 depicts an example of a QoS/QoE management system, in accordance with some example embodiments.

FIG. 2 depicts an example of a block diagram for a policy server system 200, in accordance with some example embodiments.

The policy server system 200 may include a policy framework 205 including a high-level policies, policy scope, and/or policy definitions. For example, the policy architecture 205 may incorporate the methodology and possibility of defining policies at high levels, from which low level policies are derived programmatically by autonomous policy enforcement points. Moreover, policy architecture 205 may be configured to specify the scope of the policy such as applied to certain type of subscribers (e.g., premium data plan, and/or the like), certain type of traffic/applications (e.g., online videos), in certain time (e.g., during busy hour, and/or the like), at certain location (e.g., in specific cells, geographical area, and/or the like), at certain radio access technology (e.g., 5G millimeter wave, LTE, and/or the like.). The policy architecture 205 may also provide a policy server, with is a logical entity for the storage of policies and providing interaction/interface to the operator (although the policy server may be physically implemented as multiple network elements, physical or virtual ones, and may provide multiple interfaces to the operator, and/or other nodes).

The policy server system 200 may provide policy definition and the organization of policies into multiple abstraction levels and automatically specialize highly abstract policies into more specific ones (referred to as policy specialization). The policy system may include intelligent autonomous enforcement points at, or having access to, the user-plane to perform policy specialization by at least interpreting policies according to the network context, user context, resource context, application context, and/or the like. Moreover, the policy system may include policy signaling.

The policy server system 200 may also include policy signaling 210, as noted above, to provide signaling to one or more enforcement points. Moreover, the policy server system 200 may include policy interpretation, adaption, and enforcement 215 for autonomously interpreting high-level policy and deriving lower level QoE and/or QoS policy (which may include defining QoE and/or QoS targets).

The policy system 200 framework may, as noted, enable the definition of high-level, context-agnostic, abstract policies to capture the network operator's intent regarding QoS/QoE management and to enable a determination of whether QoE or QoS management is needed. Support for high-level abstract policies may be needed because, during policy definition, most of the contextual information (which may be required to achieve the goal of the policy through network side actions) may be inherently unknown. The contextual information may refer to the context of the actual, real-time user traffic to which the policy applies (e.g., attributes of the application such as the media rate of a video session). The context information may thus be highly dynamic and specific to each application session. Alternatively or additionally, the contextual information may refer the context of the network and other users being served by the same resources (e.g., the users served by the same radio access point, their traffic mix, the cell capacity and other available resources, congestion status, and/or the like).

The specific context in which a high-level policy needs to be enforced may materialize in real-time as users trigger resource demand by interacting with their applications and the network. However, the right actions (which may be quantified via QoE targets, QoS parameters, scheduler configuration, numerical target values, and/or the like) through which the network side mechanisms can be programmed to efficiently enforce the policy are highly context dependent. Therefore, the policy system 200 may provide a model in which policies may be defined at high abstraction levels (which may be decoupled from the resource management level of the network fabric) allowing specialization to an arbitrary context later as an integral part of policy enforcement. This may assume the existence of an autonomous, intelligent, and adaptive network function (referred to herein as the enforcement point) that is able to interpret the scope of the policy and define the network level parameters in such a way that the policy is enforced in each and every context it refers to.

The internal definition of a policy at 205 may divided into three logical parts. The first part may relate to policy scope. Policy scope may refer to a user-plane reference that identifies the traffic mix to which the policy applies. This may be a service flow, a service vertical, a certain type of application, all traffic on specific access points, radio access technologies, aggregation points, and/or the like. In some implementations, the internal policy definition may require a policy scope in order to specifying the traffic the policy applies to). The second part may relate to policy's context. Policy context may refer to a at least one condition (e.g., location, time of day, subscription of the user, real time network context such as congestion, and/or the like.) for which the policy is valid. For example, the condition may define when an enforcement point needs to trigger/activate a policy. In some implementations, a policy may not need a condition (for example, an always-on policy). The third part may relate to a policy target. The policy target may refer to the goal of the policy (e.g., QoE management, QoS management, best effort service, and/or the like) to be achieved by the enforcement point in a given context for the given scope, on various abstraction levels (see below).

Figure 3:
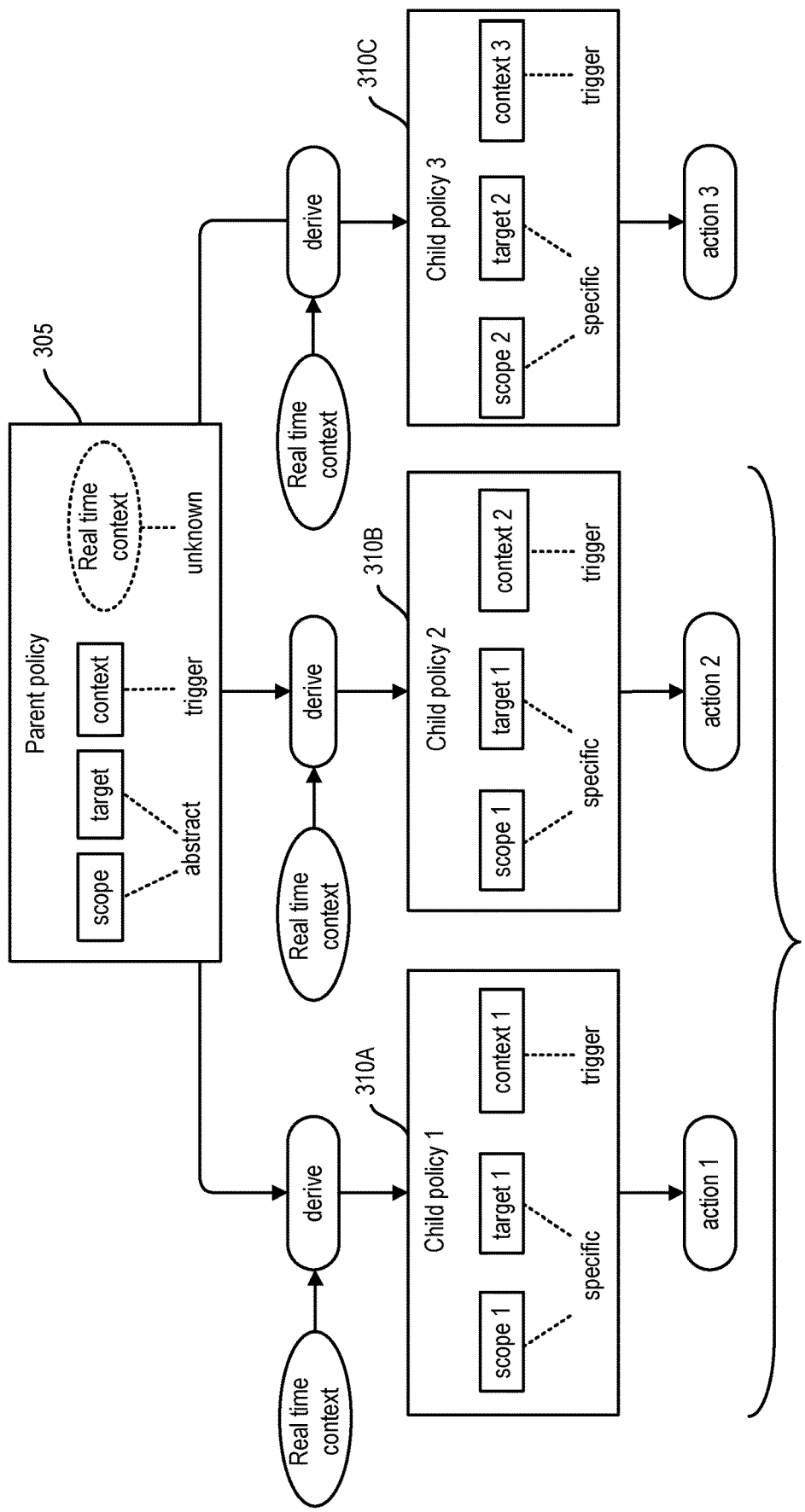
FIG. 3 depicts a policy hierarchy, in accordance with some example embodiments.

FIG. 3 depicts an example of a policy hierarchy that may be implemented at policy system 200, in accordance with some example embodiments. In the example of FIG. 3, a high-level policy 305 is configured and from that parent policy other policies 310A-C may be derived by an enforcement point. The other policies 310A-C may be derived, by an enforcement point, based on the current, real-time context determined by the enforcement point. In the example of FIG. 3, each policy has a scope, a target, and a context.

The policy derivation depicted at FIG. 3 may be a process delegated to the enforcement point and may include taking a (parent) policy at a given (usually higher) abstraction level as a template and generating a corresponding (child) policy on a relatively lower abstraction level. Policy derivation may be executed autonomously by the enforcement point, when it detects the policy context (e.g., the conditions when the policy is to be activated). The scope and target of the child policy may be specialized variants of the parent policy. The policy specialization may be based on the detection and interpretation of the current real-time network, resource, user and application context, and the policy specialization may include narrowing down the policy scope or providing specific numerical targets (e.g., for QoE or QoS parameters). The scope and target of a derived policy may be valid so long as the real-time context (to which the policy was specialized) remains relatively stable, which may require a network node or enforcement point to continuous or nearly-continuous perform policy updating and target recalculation (referred to as self-adaptation) in case the real time context changes.

Besides allowing high level policy definition and derivation, the policy system 200 may also enable the network operator to also provide explicit definitions on lower levels as well (for example, to exercise some or full control of the QoS/QoE management and choose the right level of abstraction for defining the operation of the QoS/QoE management framework).

Figure 4:
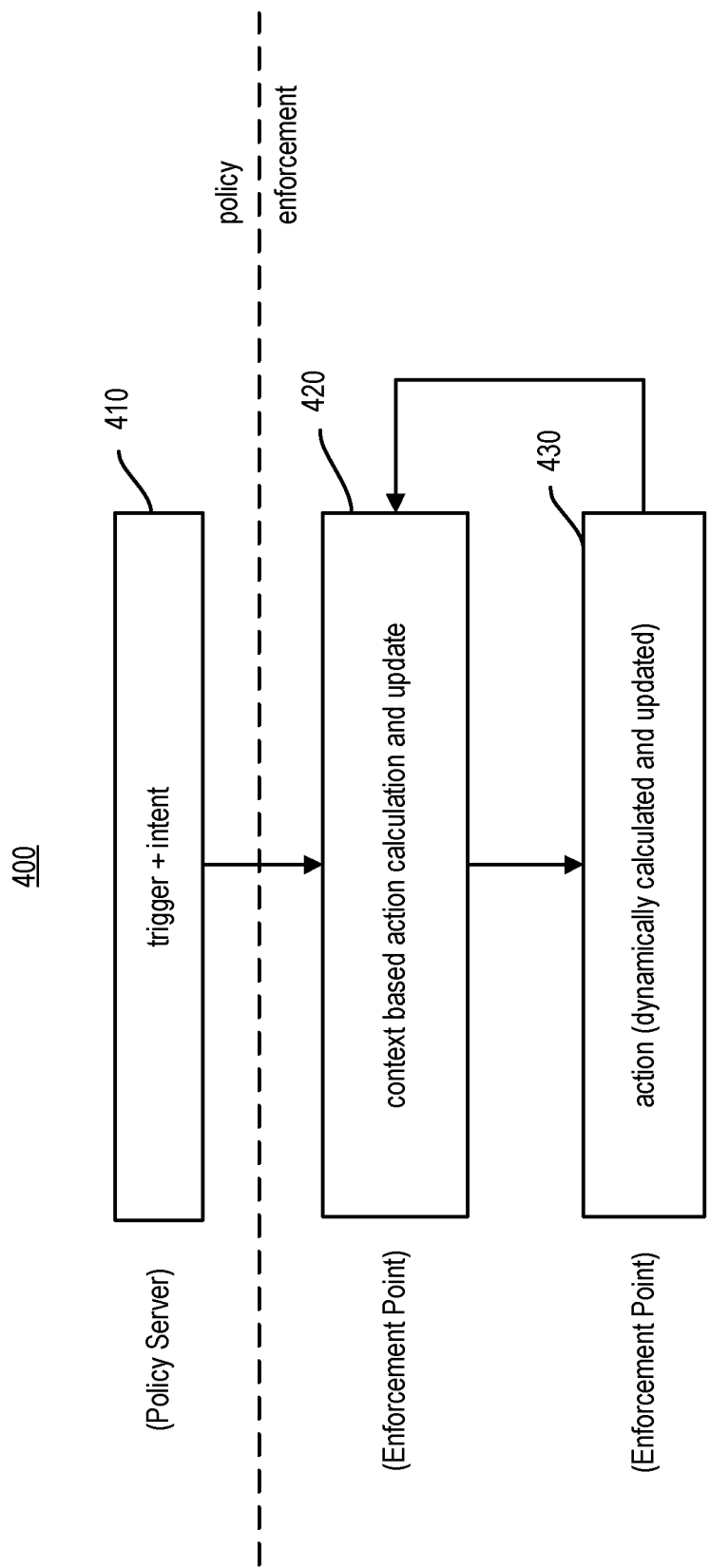
FIG. 4 depicts an example of a policy process, in accordance with some example embodiments.

FIG. 4 depicts an example process 400, in accordance with some example embodiments.

At 410, a policy server may include one or more polices including a trigger and intent, in accordance with some example embodiments. The trigger may refer to one or more conditions that would activate the policy. For example, if the subject of the policy is a given application such as Facebook, the policy trigger may be the detection of Facebook traffic. The intent of the policy may refer to the abstract goal the policy defines. For example, an abstract goal is to ensure smooth user experience (e.g., for the Facebook application run smoothly for any of the users).

At 420, an enforcement point may receive, from the policy server, the policies to be enforced, in accordance with some example embodiments. The enforcement point may check the trigger of the received policies and monitor whether a policy should be activated (for example, when a trigger is satisfied). For example, monitoring may include using user plane packet monitoring to detect whether an application targeted by a policy was been started by a user, checking whether the time interval in which a policy of is valid is reached, mobility, handover, geolocation tracking to check whether a user has entered a cell or location that was specified as the valid range of the policy, and/or the like. In case a policy needs to be activated (e.g., a user has started Facebook and there is a policy that user experience for Facebook should be smooth), the enforcement point may evaluate the context of the particular user's Facebook application. To illustrate further, the enforcement point may evaluate which cell the user is attached to, what is the available cell capacity, what other traffic is served by the cell (other traffic by the same user and by different users), in which way the user interacts with the Facebook application (e.g., user profile views, chat, gaming, photo uploading, and/or the like.), what is the amount of bandwidth or what is the delay target the Facebook application needs to have smooth user experience, and/or the like. The outcome of the evaluation may be specific to the individual user's application, thus it is a specialized interpretation of the high level policy. As the action may depend on the dynamic changes in the context, 420 may be repeated (for example, as the context is continuously monitored for changes, 420 require a change in policy enforcement actions).

At 430, an enforcement point may, based on the context evaluation 420, define one or more actions that need to be performed to achieve the policy goal. For example, the enforcement point may schedule the traffic of a congested cell serving the Facebook user so that non-Facebook traffic obtains a smaller share from the available cell capacity and the Facebook application's traffic gets a higher share compared to the current resource distribution. Based on changes in the context, the amount of bandwidth/resources needed for the Facebook user may change, so the enforcement point 430 changes the way the cell resources are distributed among the active users. Although some of the examples noted with respect to FIG. 4 refer to a specific type of applications such as Facebook, other types of applications and services may be used as well.

With respect to policy signaling and policy transfer during handover, the policies may be transferred from the policy server 102 to at least one enforcement point (which may be located in the core network and/or radio access network) during the establishment of a service flow. Alternatively or additionally, policies may be configured in the enforcement points through a management layer. Policy transfer may also be configured to ensure reliability, so that the relevant enforcement points receive the policies for the service flow traffic management in a timely way (e.g., before the actual user-plane traffic to be managed according to the policies is started).

During handover, policy signaling may also take place between radio access network nodes including enforcement points. This context transfer from one enforcement point to another may ensure the seamless continuity of the QoE management during mobility. During the handover, the contextual information and the QoE/QoS parameters (derived from the network operator defined policies by the serving policy enforcement point of each service or subservice flow of the user equipment) may be transferred to a target enforcement point.

Figure 5:
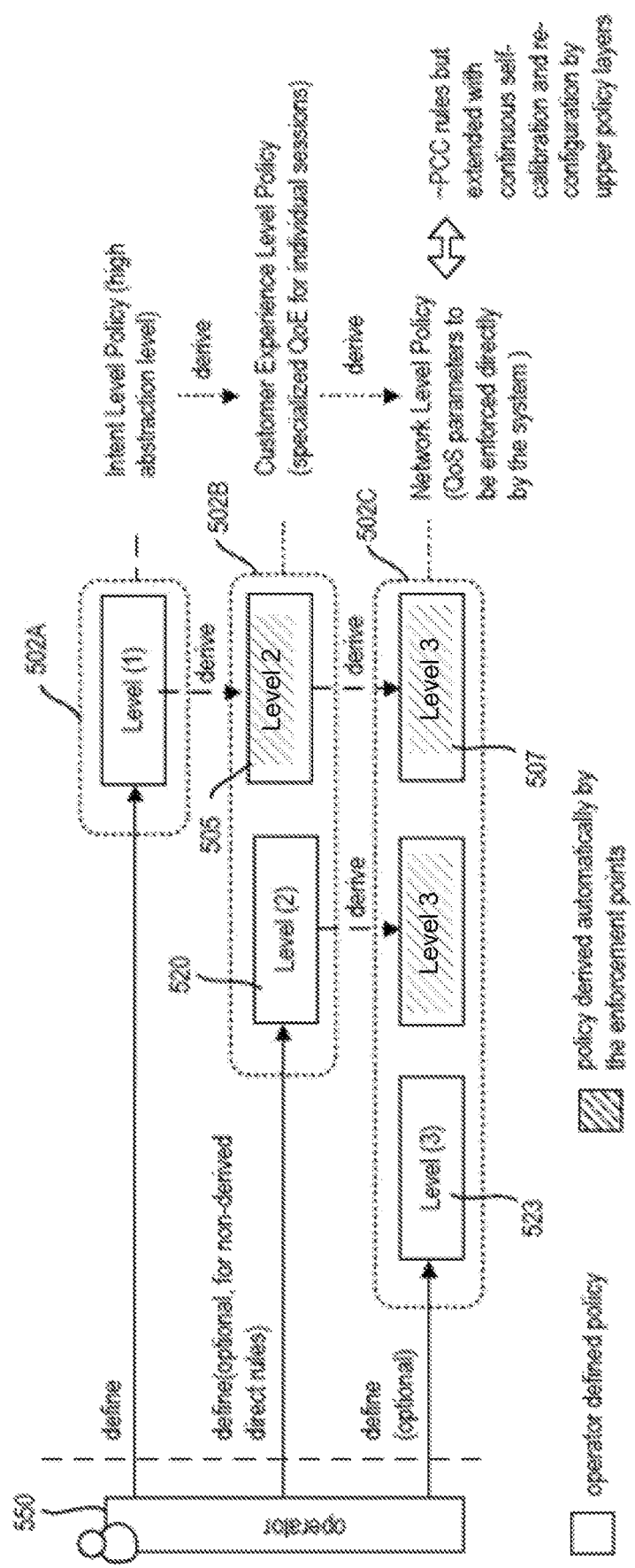
FIG. 5 depicts an example of a policy hierarchy including derived policies, in accordance with some example embodiments.

FIG. 5 depicts an example implementation including three policy levels 502A-C, in accordance with some example embodiments.

With respect to policy hierarchies, the policies may, in some example embodiments, be organized into a pre-determined set of hierarchical abstraction levels. In the example of FIG. 5, lower-level policies may be derived from higher-level ones automatically by the enforcement point. For example, a level two policy 505 may be derived automatically from a first level policy 502A, and a third level policy 507 may be derived automatically from the second level policy 505. In some example embodiments, the network operator 550 may be allowed to provide first level policy 502A as well. Additionally, the network operator 550 may also define policies explicitly on any lower abstraction level as shown at 520 and 523.

In some example embodiments, first level policies 502A may be referred to as intent level policy (InLP). The first level policies may represent a high-level preference defined by for example a network operator or provided as a default set of high-level preferences. The first level policies may define implicit targets, such as relative priorities between users, services, applications, or the first level polices may specify intent based rules such as a list of important applications for which QoE should be enforced. For example, a first level policy may specify an intent without actually specifying a QoS-type key performance indicator or how to achieve the policy target. To illustrate further, the first level policy may specify the intent that a video streaming application such as YouTube or Netflix should not stall or stop operating to buffer content during playback. In this example, the enforcement point would derive automatically through policy specialization more specific QoE/QoS policies targets.

In some example embodiments, second level policies 502*b* may be referred to as customer experience level policy (CELP). The second level policies 502*b* may provide specific QoE targets (e.g., target download time, target bandwidth) for based on the context of the application, such as the identity of the application (e.g., YouTube, Netflix, and/or the like), the application type (e.g., web browser, video streaming application, and/or the like). The second level policies 502*b* may be derived as shown at 505 and/or defined explicitly by the operator 550 based on the higher level policy 502A.

In some example embodiments, the third level policies 502*c* may be referred to as network level policy (NLP). With network level policy, QoS parameters (with numerical values) may be generated that can be used by resource management entities such as packet to enforce low-level user-plane traffic. The parameters and their values may be derived by an enforcement point based on second level QoE targets and/or may be defined directly by the operator 550 (e.g., default QoS parameters to be used for applications that are not recognized or not managed by the system, or non-dynamic service verticals such as native conversational voice with constant and well known QoS requirements, SLAs, non-QoE specific user level limits such as aggregated maximum bitrate). The third level policies 502*c* may allow direct mapping/conversion of the 3GPP QoS policies to other policies such as 5G policies and vice versa. For example, the third level policies 502*c* may capture a similar abstraction level as the dynamic policy charging control (PCC) rules, but with the capability of continuous self-calibration/-adaptation and QoS value re-definition based on upper level policies instead of continuously enforcing the same numerical QoS targets (as PCC rules may prescribe).

Policies may have different scope and may be valid in specific contexts. In some example embodiments, a policy may be triggered by a scope and context (as shown at FIG.

3 for example) associated with a user level. To illustrate, the user level may be applicable to a specific subscriber's traffic only (e.g., enables personalized service, set limitations such as the maximum bitrate that is available for the user, and/or the like).

Alternatively or additionally, a policy may be triggered by a scope and context associated with a specific user group. For example, a policy may be applicable to a specific set of users conforming to one or more selection criteria, e.g., subscription type.

Alternatively or additionally, a policy may be triggered by a scope and context associated with a specific service. For example, a policy may be applicable to a specific service vertical (e.g., an over-the-top (OTT) service/application, an Internet-of-Things (IoT) service/application, a vehicle-to-everything (V2X) application/service, and/or the like), so that the policy is triggered (for example, activated) for each service flow providing service for the corresponding vertical.

Alternatively or additionally, a policy may be triggered by a scope and context associated with a specific application. For example, the policy may be applicable to a specific application or use case within a service vertical, such as an OTT application (e.g., YouTube, Facebook, and/or the like), a broader application type (e.g., HTTP(S) video streaming, real time multimedia streaming, interactive data, and/or the like), a native telecommunications service (such as IMS voice, IMS video, and/or the like), content hosted on a specific content delivery network (CDN) or served by an external application service provider (ASP) software/legal entity.

Alternatively or additionally, a policy may be triggered by a scope and context associated with a specific location specific. For example, the policy may be applicable to connections served by a given access point, cell, geographical or service area, and/or the like.

Alternatively or additionally, a policy may be triggered by a scope and context associated with a specific access technology. For example, the policy may be applicable to a specific radio access technology such as millimeter wave, centimeter wave, Wi-Fi, LTE wide area, and/or the like.

Alternatively or additionally, a policy may be triggered by a scope and context associated with a specific time. For example, the policy may be applicable to a certain time interval(s) (e.g., a onetime event, periodic intervals, time of day, and/or the like.).

Alternatively or additionally, a policy may be triggered by a scope and context associated with a device type or specific device capability. For example, the policy may be applicable to devices with certain type (e.g., smartphone, tablet, specific model version, and/or the like) or with devices having certain capabilities (e.g., support for radio access technology, a given level of hardware specification such as resolution, and/or the like).

Alternatively or additionally, a policy may be triggered by a scope and context associated with a specific mobility state. For example, the policy may be applicable to devices being for example stationary, nomadic, and/or mobile and the mobility may be detected by, or reported to, the network.

Alternatively or additionally, a policy may be triggered by a scope and context associated with a specific network/resource context. For example, the policy may be applicable in case of specific network status (e.g., radio congestion and/or the like) occurs or specific resource versus demand relation happens (e.g., the overall resource demand of the applications exceeds the amount of available resources).

More general or global policies (e.g., semi-static policies or those not specific to particular users, subscriptions, or services examples of which include default QoE targets, default service parameters, location or radio access specific policies) may be pushed by the policy server 102 to an enforcement point to enable enforcement. These global policies may be configured through the management layer (e.g., by the operational support system) to the enforcement point(s), rather than being signaled in conjunction with each service establishment.

During a handover, the transfer of policy information from a source or previously serving access point to a target access point may convey some, if not all information, from the source enforcement point to the target enforcement point to enable the target enforcement point to replicate and continue (as much as possible under the context of the target access point) the behavior and operation of the source enforcement point on already established user-plane traffic. The policy transfer may be an integral part of the handover signaling or it can be a dedicated signaling procedure that takes place between the involved enforcement points.

Figure 6:
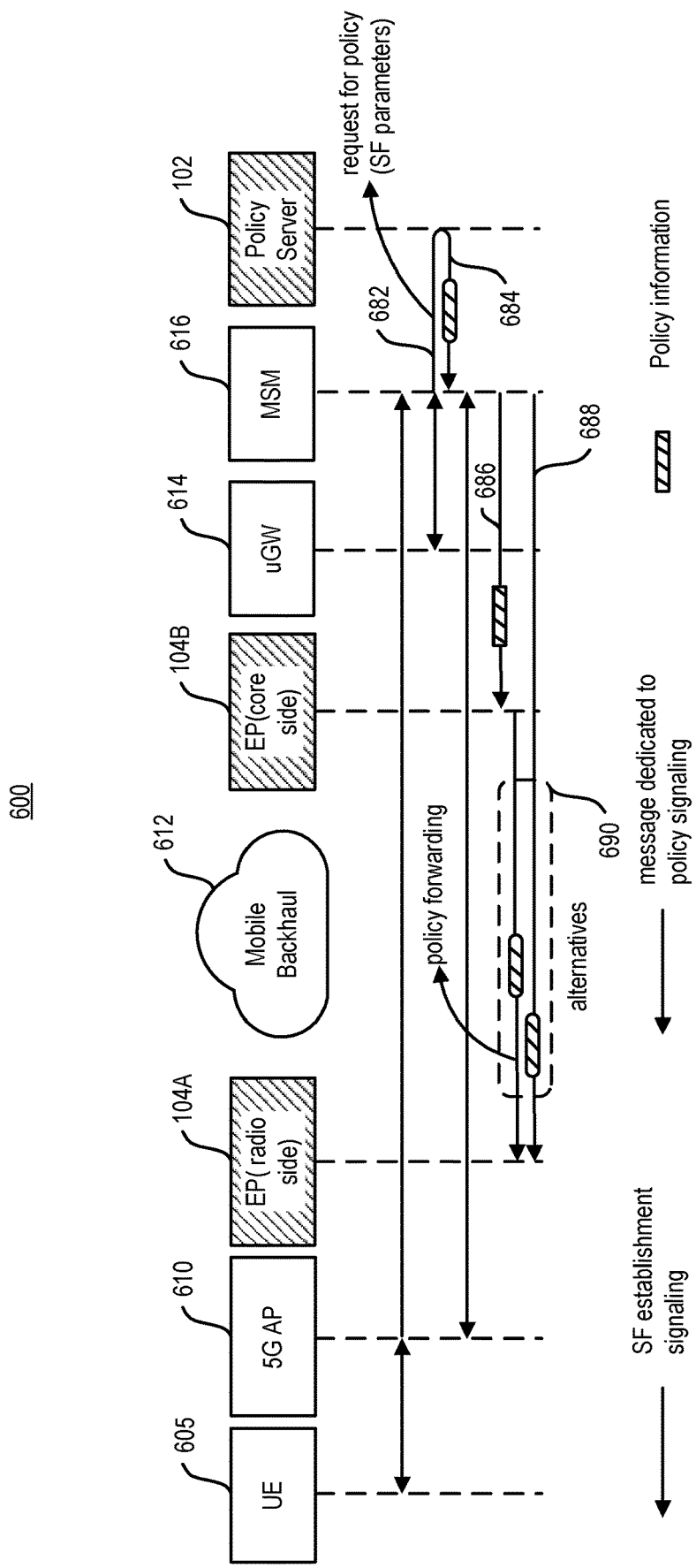
FIG. 6 depicts an example of policy signaling, in accordance with some example embodiments.

FIG. 6 depicts a signaling diagram 600, in accordance with some example embodiments. The signaling diagram 600 depicts a user equipment 505, a wireless access point (e.g., a base station and/or the like) 610, an enforcement point 104A, a backhaul 612 to a core network where an enforcement point 104B is located, a user-plane gateway (uGW) 614, a control plane node such as a mobility and session management (MSM) node 616, and a policy server 102.

The signaling process 600 may ensure that policy information is successfully distributed to the enforcement points that participate in handling of service flow before the actual user-plane traffic for that service flow is started.

In some example embodiments, policy signaling may be performed during the establishment of a service flow as shown at FIG. 6. For example, user level or service/application level policies may be signaled by the policy server 102 to at least one enforcement point 104 during the establishment of the service flow as the validity of such policies depends on the type of connection established by the user equipment or the identity of the user attaching to the network.

To signal the policy from the policy server 102 to an enforcement point such as enforcement point 104B or 104A, the policy signaling may be an integral part of the service flow signaling as shown at FIG. 6. During service flow establishment, the mobility and session management (MSM) node 616 send to the policy server 102 a request 682 for policy for the service flow being established. At 684, the policy server 102 may respond to mobility and session management (MSM) node 616 by providing policy information for the service flow being established. At 686, the mobility and session management (MSM) node 616 may send the policy information to a core network node including the enforcement point 104B. Alternatively or additionally, the mobility and session management (MSM) node 616 may send, at 688, the policy information to the radio access node including enforcement point 104A. Alternatively or additionally, the enforcement point 104B may, at 690, forward to the enforcement point 104A the policy information provided by the mobility and session management (MSM) node 616.

The enforcement points 104A-B may implemented as a logical functionality which can be physically be hosted on for example a node providing radio functions (e.g., c-RAN, 5G AP, and/or the like) or user-gateway (uGW) core functions. Similarly, the policy server 102 may be co-located or collapsed into the mobility and session management 616, the 5G control-plane functionality, and/or the like. In that sense, the signaling may represent logical information sharing but not necessarily require a dedicated signaling protocol to be introduced between all the involved nodes.

Figure 7:
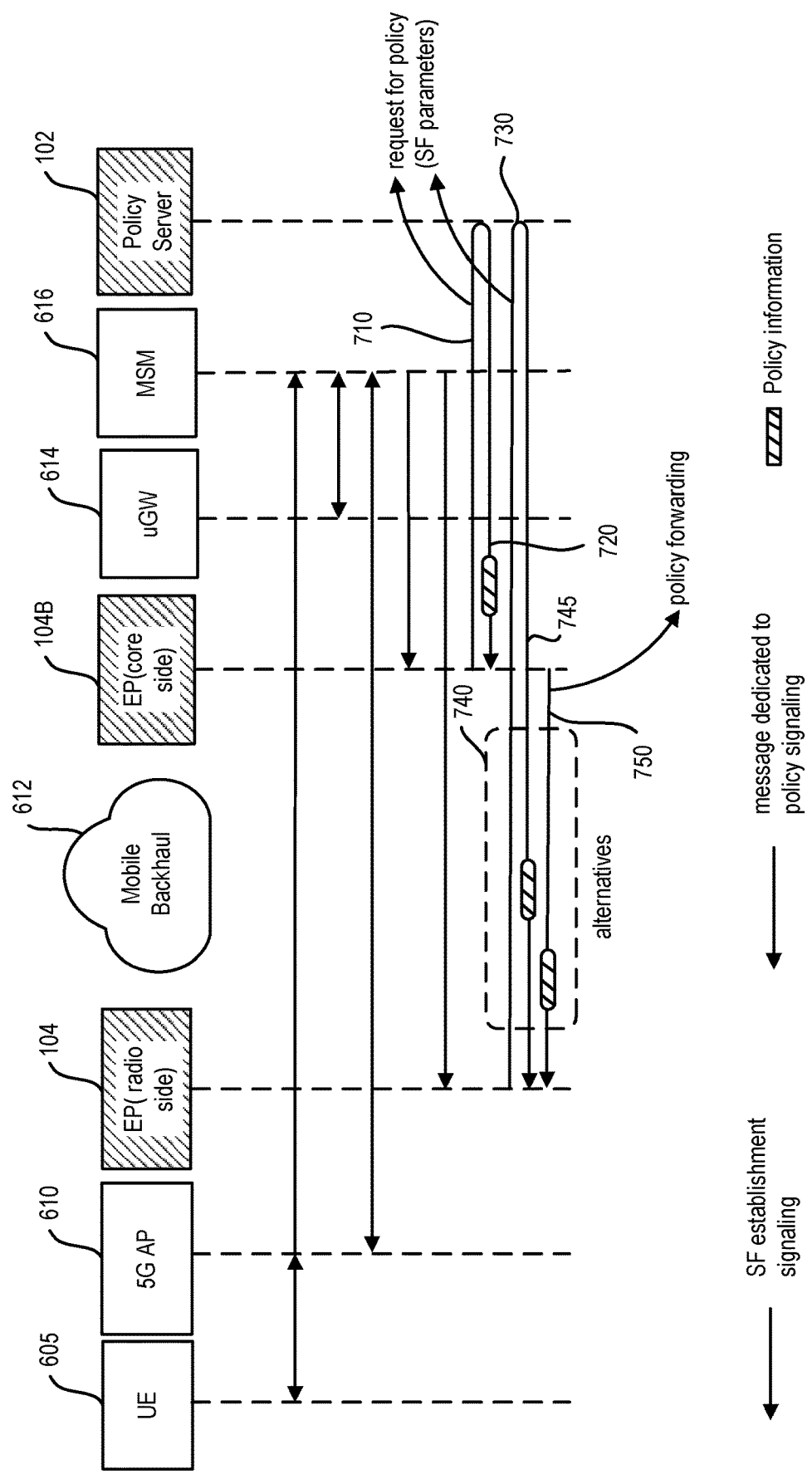
FIG. 7 depicts another example of policy signaling, in accordance with some example embodiments.

FIG. 7 depicts another signaling diagram 700, in accordance with some example embodiments. In the example of FIG. 7, the policy signaling may be configured as a dedicated control-plane procedure, which is triggered by the service flow establishment procedure. Unlike FIG. 6, the enforcement points may directly access the policy server 102 to obtain the policy information.

As the enforcement points 104A-B themselves are included in the service flow establishment procedure (as they need to instantiate the protocol layer entities dedicated to serve the new service flow), the enforcement points may start an additional procedure to fetch the policies directly from the policy server 102. In case the service flow is routed through the core network (e.g., an application or OTT service delivering Internet content), it may be sufficient that the core side enforcement point 104B fetches, at 710, the relevant policies from the policy server 102 and it forwards the policies to the radio side enforcement point 104A. For example, enforcement point 104B may, at 710, send a request to policy server for policy information for the service flow being established. In response, enforcement point 104B may, at 720, receive from the policy server policy information for the service flow being established. The enforcement point 104B may, at 750, forward the policy information provided by the policy server at 720 to the radio side enforcement point 104A. Alternatively or additionally, enforcement point 104A may, at 740, send a request to policy server for policy information for the service flow being established. In response, enforcement point 104B may, at 745, receive from the policy server policy information for the service flow being established.

During the above-described signaling, some auxiliary information may be fetched from the management/subscriber system by the enforcement points instead of being collected from the policy server or being part of the policy signaling. An example of this is retrieving subscription profiles in order to resolve the policy context (e.g., decide whether a subscription specific policy applies to a particular service flow that is being established). Alternatively or additionally, some, if not all, policies may be retrieved from the management/subscriber system (e.g., the policy server functionality may be integrated in for example, the operational support system, OSS).

Enforcement points may be configured to include the capability of policy derivation as noted above. When this is the case, an enforcement point may receive a high-level policy from a policy server, and determine a lower-level QoE target or QoS parameter according to the context with respect to an application context, a user context, a network context, and/or the like. The context may be determined autonomously or automatically during the session of an application and based on the current, real-time state or context of the application, user, network, and/or the like. The following provides an example of how a high-level policy can be used to derive a lower-level policy.

Suppose a streaming video application or service such as YouTube is considered by a network operator as an important application that should have good or high quality QoE enforcement. When this is the case, a high-level policy such as policy 305 at FIG. 3 or the first level policy 502A of FIG. 5 may include a scope and a context of for example any YouTube session and the high level QoE target is good QoE (which may be considered an intent level policy). In this example, the high-level policy indicates that the YouTube sessions will be detected and served via a dedicated service or subservice flow by an enforcement point. Moreover, the service parameters (e.g., QoE targets) may be generated for each YouTube session separately depending on the detected/estimated session specific parameters (e.g., media rate and/or the like) and current context information. In this example, the YouTube session parameters may not be known in advance as each session may be unique with respect content. As such, the second level and third level policy parameters may be dynamically defined by the enforcement point whenever a new YouTube session is detected.

Suppose the application or service relates to web page downloads. In this example, the second level target 505 (FIG. 5) may relate to a target download time such as 5 seconds for each web page (which is an explicit QoE target) can be defined by the network operator and this target may be applied to each and every session. The value of the download time may be based on determined in a variety of ways including crowdsourced. The exact service parameters (e.g., required bandwidth) may not available since each web page download is somewhat unique with respect to size, structure, content, browser type, and/or server behavior. These service parameters may be derived as shown at 502C by the enforcement point for each web session individually as the web sessions are started.

With respect to the third level 502C, a policy for a virtual private network (VPN) application for example may be configured to have a QoS policy of maximum latency below 50 milliseconds and a minimum bandwidth of 5 megabits per second. In this example, a service level agreement for a corporate subscription profile may be applied directly using QoS parameters since the enforcement point does not have access to the underlying application given the VPN's encryption. In this example, the enforcement point may configure a default QoS parameter for this type of application. Alternatively or additionally, an application detection and control function and/or a traffic detection function may be used to separate VPN traffic into a dedicated bearer with the specified QoS parameter.

In the hierarchical policy example above, the scope and context of the policies in the above example is the following: the first level may apply to all OTT users (or their sessions) with a YouTube while the second level policy may apply to all OTT users (or their sessions) with a web browsing application. The third level policy in this example has a scope and context that applies to users (or their sessions) that have a specific subscription profile and are using a VPN.

Figure 8:
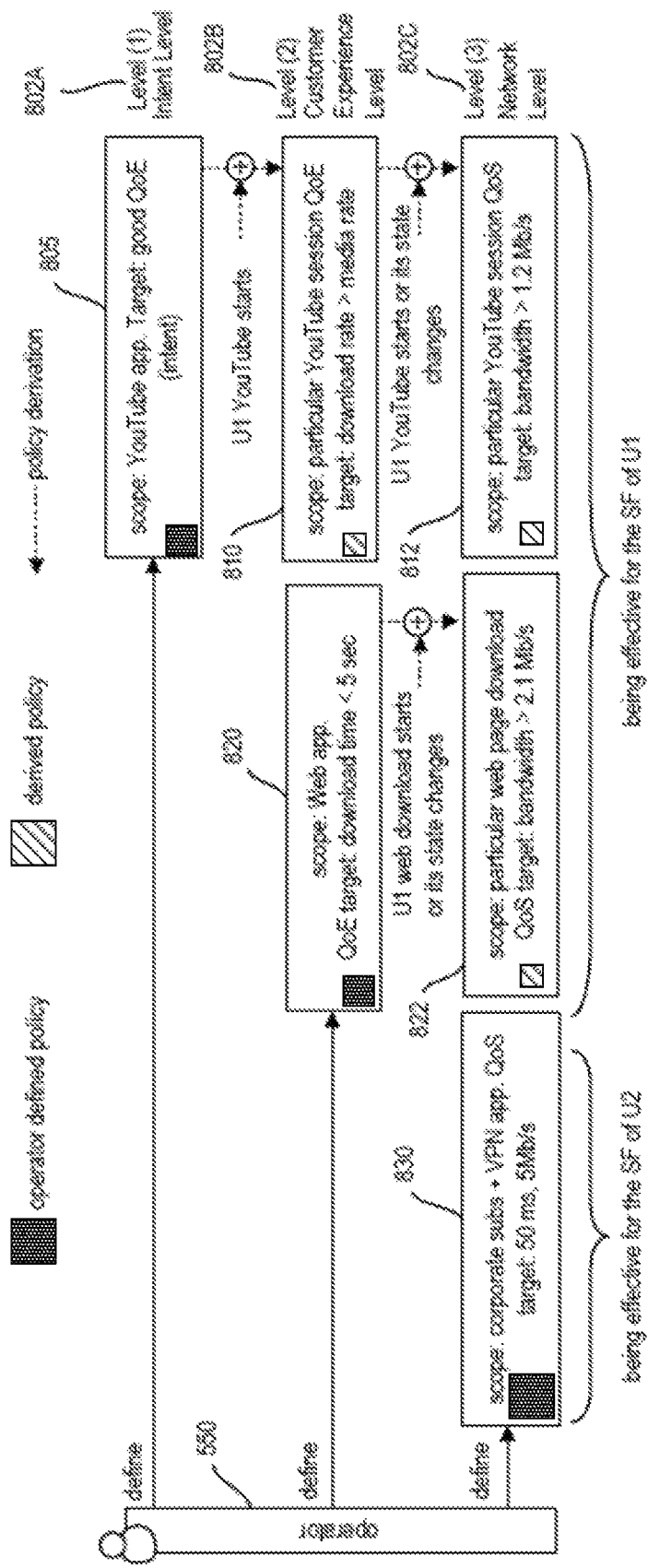
FIG. 8 depicts another example of a policy hierarchy including derived policies, in accordance with some example embodiments.

FIG. 8 depicts another example implementation including three policy levels 802A-C, in accordance with some example embodiments.

In the example of FIG. 8, the above noted YouTube application example is depicted as having a higher level policy of "good QoE" 805. In this example if a YouTube application session is detected as starting, a second level policy 810 for the YouTube session may be derived by the enforcement point and a QoE policy may be defined so that the download rate should be greater than the rate of the YouTube media. In this example, the third level policy (which may also be derived by the enforcement point) specifies that the bandwidth should be greater than 1.2 megabits per second. FIG. 8 also shows a second level policy for the webpage download application as having a QoE target of less than 5 seconds. In this example, the second level policy may be defined by a network operator

550. The enforcement point may derive for a webpage download a third level policy, which in this example is a QoS parameter of bandwidth less than 2.1 megabits per second. FIG. 8 also shows a third level policy 830 for the VPN example above in which a QoS target parameter is provided (which in this example is defined by a network operator 550).

Upon an establishment of a service flow, an enforcement point may obtain the policies from a policy server. In the YouTube and webpage sessions for example, only the first level and second level policies are needed, whereas for corporate or VPN session all three policies may be needed by the enforcement point.

To illustrate further, suppose that the following two users are connected to the same cell: a first user who starts to watch a YouTube video and occasionally downloads web pages simultaneously and second user on a corporate VPN who connects to the VPN service. The system including the enforcement point may monitor user traffic to detect when one of the policies needs to become effective. For the first user, the operator defined first and second level policies 805 and 810 may be activated when YouTube and web traffic is detected. Since for YouTube the operator-defined policy is on the first level, the system may automatically derive a second level policy. The second level policy 810 may define that in order to provide good QoE for the video download (e.g., implement the corresponding first level policy), the QoE target for the video may be achieved through a bandwidth that is sufficient for the video to pre-buffer and start the playback quickly (referred to as incubation phase) and higher than the media rate of the video so that it can be played back continuously without stalling (after the pre-buffering is finished). This second level policy may only apply to this particular video download session (e.g., the scope of the policy is narrowed compared to the first level parent policy) because the amount of bandwidth and the momentary state of the video (pre-buffering, playing, and/or the like) is specific to each video session. The enforcement point may also derive a third level policy 812 that quantifies the specific bandwidth value as a QoS parameter (e.g., 1.2 megabits per second in the example) that is valid at a given time and suitable to be directly enforced by the system (e.g., by programming a packet scheduler). If the video state changes, the third level policy may be updated by the enforcement point with a higher or lower bandwidth value, which may be performed autonomously by the enforcement point.

To illustrate the policy specialization derivation further, the following example is provided. The policy may be derived, as noted, in a self-adapting way that measures the current throughput achieved by an application such as a YouTube video download. Based on an evaluation of the arrival pattern of the YouTube packets, the enforcement point may detect if the arrival pattern indicates that the current throughput is too much, the right amount or too little. If too much, the enforcement point may adaptively decrease the bandwidth target until the pattern indicates it is the right amount. If too little, the enforcement point may adaptively increases the bandwidth target until the pattern indicates it is acceptable. The arrival pattern refers to idle and/or busy periods of multimedia chunks requested by a client application session with a pace according to the video multimedia encoding rate. During the initial incubation phase, a sufficiently high bandwidth target may be given that enables fast pre-buffering. After the pre-buffering pattern is over, the bandwidth target may be adapted as described above.

For the first user's web traffic, the enforcement point may start with the second level 820 (which in this example is operator 550 defined) and derive a third level policy 822 in order to specify how to enforce it. The third level policy may also include a bandwidth QoS parameter, based on the second level requirement of downloading a specific amount of data (e.g., the size of the web page) within a given target download time (e.g., 5 seconds). Since each web page has a different size and structure, the value of the bandwidth QoS parameter may be defined by the enforcement point at the time the web page download actually starts and the enforcement point detects attributes from user-plane traffic flows. And, as the web page download progresses (e.g., the amount of downloaded/remaining data changes) and the time left from the 5 seconds budget decreases, the third level bandwidth target may be updated by the enforcement point (similarly to the YouTube example) so that the QoE target is met.

The second user's VPN traffic may trigger the third level policy 830 supplied by the operator 550 with explicit QoS parameters, thus in this example there is no need for policy derivation and the given QoS parameters can be enforced directly by the enforcement point.

Although the previous example describes examples of policy, other types of policies may be used as well.

In the example above, the enforcement point may implement the policies for a new session and may detect when there is a change in the context of the session. The context of the session may affect user-plane traffic (for example, changing the video playback from 480 to 720p), and thus be detected by the enforcement point to determine whether a policy change is in order. However, other types of context changes that can be less dynamic such as time, location, and/or the like may (such as time, location, and/or the like) may trigger a policy update or derivation as well.

In some example embodiments, the enforcement point may need to select from multiple policies. When this is the case, the enforcement point may be configured to apply a more specific or stricter policy.

Figure 9:
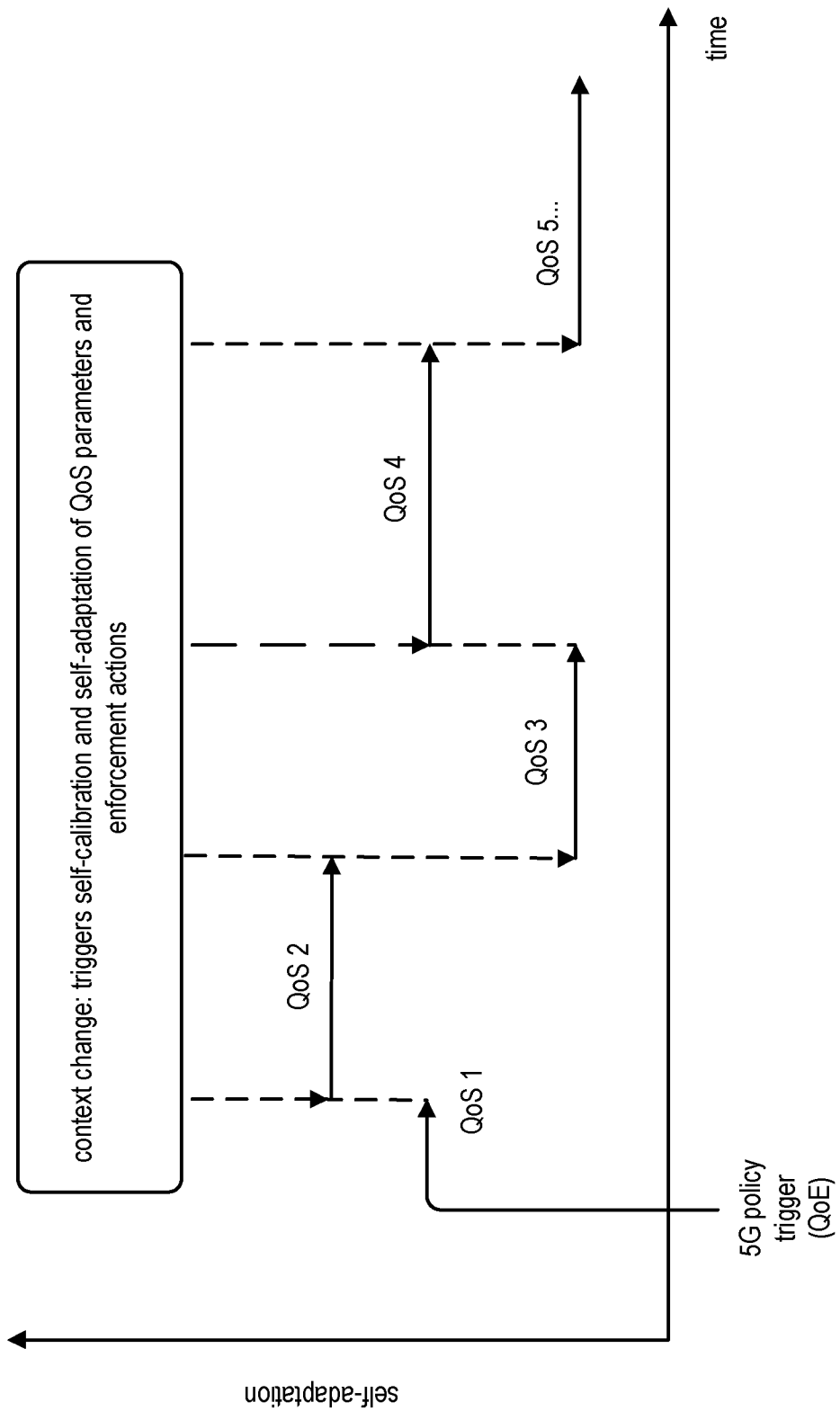
FIG. 9 plots QoS being adapted over time, in accordance with some example embodiments.

FIG. 9 depicts a plot over time showing how self-adaptation can change the QoS policy over time as conditions or context changes to keep the QoS policy consistent with the higher-level policy, such as the intent of the higher-level policy.

Without in any way limiting the scope, interpretation, or application of the claims appearing herein, a technical effect of one or more of the example embodiments disclosed herein may include enhanced QoE and QoS control of applications and services as well as enhanced utilization of network resources.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (application scheduler 300IC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any non-transitory computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. A method comprising:
   detecting, by an enforcement point, an initiation of a session for an application, wherein the enforcement point comprises or is comprised in a radio access network node;
   requesting, by the enforcement point, a first level quality of experience policy for the detected session;
   receiving, from a policy server, the first level quality of experience policy for the detected session;
   deriving, based on the first level quality of experience policy and context information indicative real-time user traffic associated with the application, at least one of a second, lower level quality of experience target or a second, lower level quality of service target for the detected session, the second, lower level quality of experience target or the second, lower level quality of service target being lower in experience or quality when compared to the first level quality of experience policy;
   enforcing, by the enforcement point, at least one of the second, lower level quality of experience target or the second, lower level quality of service target on the detected session.

2. The method of claim 1, wherein the first level quality of experience policy comprises a parent policy, wherein the first level quality of experience policy represents an indication of quality from a perspective of a user.

3. The method of claim 2, wherein the parent policy comprises a trigger condition and a policy target representative of an intent policy type.

4. The method of claim 1, wherein the second, lower level quality of experience target comprises at least one of a target download time or a target bandwidth.

5. The method of claim 1, wherein the enforcement point requests policy from the policy server as part of a service flow establishment for the session.

6. The method of claim 1, wherein the enforcement point requests policy from an intermediate node as part of a service flow establishment for the session.

7. The method of claim 1, wherein the deriving and the enforcing is performed during the session to adaptively update the at least one of the second, lower level quality of experience target or the second, lower level quality of service target.

8. The method of claim 1, wherein the deriving is further based on at least one of context information associated with the application or network demand for resources.

9. An apparatus, comprising:
   at least one processor; and
   at least one memory including computer program code, the at least one memory and the computer program code configured to, with the at least one processor, cause the apparatus to perform at least the following:
   detect, by the apparatus, an initiation of a session for an application, wherein the apparatus comprises or is comprised in a radio access network node;
   request, by the apparatus, a first level quality of experience policy for the detected session;
   receive, from a policy server, the first level quality of experience policy for the detected session;
   derive, based on the first level quality of experience policy and context information indicative real-time user traffic associated with the application, at least one of a second, lower level quality of experience target or a second, lower level quality of service target for the detected session, the second, lower level quality of experience target or the second, lower level quality of service target being lower in experience or quality when compared to the first level quality of experience policy; and
   enforce, by the apparatus, at least one of the second, lower level quality of experience target or the second, lower level quality of service target on the detected session.

10. The apparatus of claim 9, wherein the first level quality of experience policy comprises a parent policy, wherein the first level quality of experience policy represents an indication of quality from a perspective of a user.

11. The apparatus of claim 10, wherein the parent policy comprises a trigger condition and a policy target representative of an intent policy type.

12. The apparatus of claim 11, wherein the second, lower level quality of experience target comprises at least one of a target download time or a target bandwidth.

13. The apparatus of claim 9, wherein the quality of service target comprises a third level child policy.

14. The apparatus of claim 9, wherein the apparatus requests policy from the policy server as part of a service flow establishment for the session.

15. The apparatus of claim 9, wherein the apparatus requests policy from an intermediate node as part of a service flow establishment for the session.

16. The apparatus of claim 9, wherein the apparatus derives and enforces during the session to adaptively update the at least one of the second, lower level quality of experience target and/or the second, lower level quality of service target.

17. The apparatus of claim 9, wherein at least one of the second level quality of experience target or the quality of service target is derived based on at least one of context information associated with the application or network demand for resources.

18. A non-transitory computer-readable storage medium including program code which when executed causes operations comprising:

detecting, by an enforcement point, an initiation of a session for an application, wherein the enforcement point comprises or is comprised in a radio access network node;

requesting, by the enforcement point, a first level quality of experience policy for the detected session;

receiving, from a policy server, the first level quality of experience policy for the detected session;

deriving, based on the first level quality of experience policy and context information indicative real-time user traffic associated with the application, at least one of a second, lower level quality of experience target or a second, lower level quality of service target for the detected session, the second, lower level quality of experience target or the second, lower level quality of service target being lower in experience or quality when compared to the first level quality of experience policy;

enforcing, by the enforcement point, at least one of the second, lower level quality of experience target or the second, lower level quality of service target on the detected session.

\* \* \* \* \*